(12) United States Patent
Yang

(10) Patent No.: US 11,179,966 B2
(45) Date of Patent: Nov. 23, 2021

(54) ECCENTRIC OMNIDIRECTIONAL WHEEL

(71) Applicant: Shantou Yier Le Toy Co., Ltd., Guangdong (CN)

(72) Inventor: Shao Xuan Yang, Guangdong (CN)

( * ) Notice: Subject to any disclaimer, the term of this patent is extended or adjusted under 35 U.S.C. 154(b) by 53 days.

(21) Appl. No.: 16/691,608

(22) Filed: Nov. 22, 2019

(65) Prior Publication Data
US 2020/0406675 A1 Dec. 31, 2020

(30) Foreign Application Priority Data
Jun. 28, 2019 (CN) .......................... 201921013986.0

(51) Int. Cl.
*B60B 19/00* (2006.01)
*B60B 19/12* (2006.01)
*B60K 7/00* (2006.01)
*B60K 17/04* (2006.01)
*B60K 17/14* (2006.01)
*B60Q 1/02* (2006.01)

(52) U.S. Cl.
CPC ............ *B60B 19/003* (2013.01); *B60B 19/12* (2013.01); *B60K 7/0007* (2013.01); *B60K 17/043* (2013.01); *B60K 17/14* (2013.01); *B60Q 1/02* (2013.01)

(58) Field of Classification Search
CPC ...... B60B 19/003; B60B 19/12; B60B 19/125
See application file for complete search history.

(56) References Cited

U.S. PATENT DOCUMENTS

| | | | | |
|---|---|---|---|---|
| 7,056,185 B1* | 6/2006 | Anagnostou | ......... | A63H 17/262 180/167 |
| 7,641,288 B1* | 1/2010 | Baker | ................... | B60B 19/003 301/5.23 |
| 2003/0227152 A1* | 12/2003 | Huang | ................... | B62K 17/00 280/205 |
| 2003/0228961 A1* | 12/2003 | Huang | .................... | B62K 1/00 482/110 |
| 2008/0018167 A1* | 1/2008 | Fuji | ........................ | B60B 19/003 301/5.23 |
| 2009/0065113 A1* | 3/2009 | Gunther | ................ | B60B 19/125 152/1 |
| 2010/0270850 A1* | 10/2010 | Brudniok | .............. | B60B 19/003 301/5.23 |
| 2011/0272998 A1* | 11/2011 | Lee | ......................... | B60B 19/12 301/5.23 |
| 2013/0292918 A1* | 11/2013 | Schlee | .................... | B60B 3/002 280/79.11 |

(Continued)

FOREIGN PATENT DOCUMENTS

CN 109621446 A * 4/2019

*Primary Examiner* — Brian L Swenson
(74) *Attorney, Agent, or Firm* — Prakash Nama; Global IP Services, PLLC

(57) ABSTRACT

An eccentric omnidirectional wheel, having a fixed wheel frame having a hollow center, a driving ring, a driving mechanism and at least one slanted rollable barrel evenly distributed around an outer perimeter of the driving ring; the driving ring sleeves onto an outer perimeter of the fixed wheel frame and is rotatably connected with the fixed wheel frame; an eccentric shaft seat is mounted at an inner perimeter of the fixed wheel frame; the driving mechanism is connected with the driving ring to achieve motion transmission.

7 Claims, 7 Drawing Sheets

(56) References Cited

U.S. PATENT DOCUMENTS

| | | | |
|---|---|---|---|
| 2014/0232174 A1* | 8/2014 | Zdrahal | B60B 33/045 |
| | | | 301/5.23 |
| 2018/0050563 A1* | 2/2018 | Zhang | B60B 19/003 |
| 2018/0126779 A1* | 5/2018 | Brandl | B60B 3/085 |
| 2020/0156459 A1* | 5/2020 | Henningsgard | B66C 23/46 |

* cited by examiner

ECCENTRIC OMNIDIRECTIONAL WHEEL

BACKGROUND OF THE INVENTION

The present invention relates to the technical field of toy car wheels, and more specifically relates to a kind of eccentric omnidirectional wheel.

Toys for children can promote children's learning and make them feel entertaining. Although there are various types of toy cars in the market having different shapes, the main structure of a toy car generally comprises a passenger compartment, a chassis, wheels and a driving mechanism, generally operated by remote control and powered by batteries which drive a motor to rotate the wheels through motion transmission via a series of motion transmission mechanisms. As such, a toy car can simulate a real car. To increase product attractiveness, various structures and functions have been developed for toy cars. CN104015556A has disclosed a kind of omnidirectional wheel which can effectively achieve omnidirectional movements, wherein a wheel shaft is fixed at a center position depriving it from being configured as an eccentric wheel. As such, the height of the car cannot be lowered by lowering the wheel shaft, therefore the car lacks stability. Also, the entire wheel has to be rotated during movement. Further, wheel center is simply a solid structure which is just too common and ordinary.

BRIEF SUMMARY OF THE INVENTION

In view of the aforesaid disadvantages now present in the prior art, the present invention provides an eccentric omnidirectional wheel which has a wheel shaft seat that can be configured to have an eccentric structure according to practical needs, to lower the height of the toy car and therefore increase stability of the toy car.

The present invention has the following technical solutions: An eccentric omnidirectional wheel, comprising a fixed wheel frame having a hollow center, a driving ring, a driving mechanism and at least one slanted rollable barrel evenly distributed around an outer perimeter of the driving ring; the driving ring sleeves onto an outer perimeter of the fixed wheel frame and is rotatably connected with the fixed wheel frame; an eccentric shaft seat is mounted at an inner perimeter of the fixed wheel frame; the driving mechanism is connected with the driving ring to achieve motion transmission.

Preferably, the driving mechanism comprises an internal gear provided around an inner perimeter of the driving ring, and a motor that drives the internal gear.

Preferably, the eccentric shaft seat 4 also has a hollow center; an outer perimeter of the eccentric shaft seat is provided with a rib; the motor is mounted in the eccentric shaft seat; the motor is connected with the internal gear to achieve motion transmission through a set of reduction gears.

Preferably, a position limiting flange is provided around a perimeter of an inner end surface of the internal gear; at least one direction guiding wheel is provided around an inner perimeter of the position limiting flange.

Preferably, the fixed wheel frame comprises two parts, which are inner and outer fixed wheel frame shells; internal sides of both the inner and outer fixed wheel frame shells are each provided with at least one inwardly protruding accommodating chamber and a screw sheath provided in each inwardly protruding accommodating chamber; the at least one direction guiding wheel is provided within an enclosure of said at least one inwardly protruding accommodating chamber of one of the internal sides of the inner and outer fixed wheel frame shells and corresponding said at least one inwardly protruding accommodating chamber of another one of the internal sides of the inner and outer fixed wheel frame shells.

Preferably, the driving ring comprises two parts, which are inner and outer driving ring shells; at least one screw accommodating component is provided in between the inner and outer driving ring shells.

Preferably, the driving ring is internally provided with position fixing columns mounted correspondingly on inner sides of both the inner and outer driving ring shells; the position fixing columns on the inner sides of both the inner and outer driving ring shells abut and connect correspondingly to one another; an outer perimeter of the internal gear is provided with position fixing ears; the position fixing ears are positioned corresponding to the position fixing columns; the position fixing columns are inserted into the position fixing ears correspondingly.

Preferably, said at least one slanted rollable barrel comprises a rotational shaft and at least one barrel, provided around a peripheral side of the driving ring, and configured in a slanted angle with respect to a central axis of the eccentric omnidirectional wheel; the at least one barrel sleeves around an outer side of the rotational shaft.

Preferably, an outer end surface of the fixed wheel frame is provided with a light emitting device.

The present invention has the following beneficial effects: An eccentric omnidirectional wheel, wherein the eccentric shaft seat is mounted at an inner perimeter of the fixed wheel frame having the hollow center; the eccentric shaft seat is connected to an external wheel shaft, such that the eccentric omnidirectional wheel can be configured eccentrically which lowers the height of a toy car and therefore increases its stability; the eccentric shaft seat can be mounted at any position of the inner perimeter of the fixed wheel frame, such that the height and position of the eccentric shaft seat in the fixed wheel frame can be adjusted according to specific requirements, thereby adjusting the height of the overall toy car which the eccentric omnidirectional wheel is correspondingly installed into. When four eccentric omnidirectional wheels of the present invention are mounted to the toy car, the toy car can achieve drifting movement easily, and can also easily achieve movements like turning, U-turning and rotation. The outer side of the fixed wheel frame is installed with fixedly positioned lights without affecting movement of the toy car. Therefore the toy car of the present invention has colorful light effects and is more entertaining.

BRIEF DESCRIPTION OF THE DRAWINGS

The present invention will be described further below with reference to some drawings and an embodiment.

DETAILED DESCRIPTION OF THE INVENTION

Figure 1:
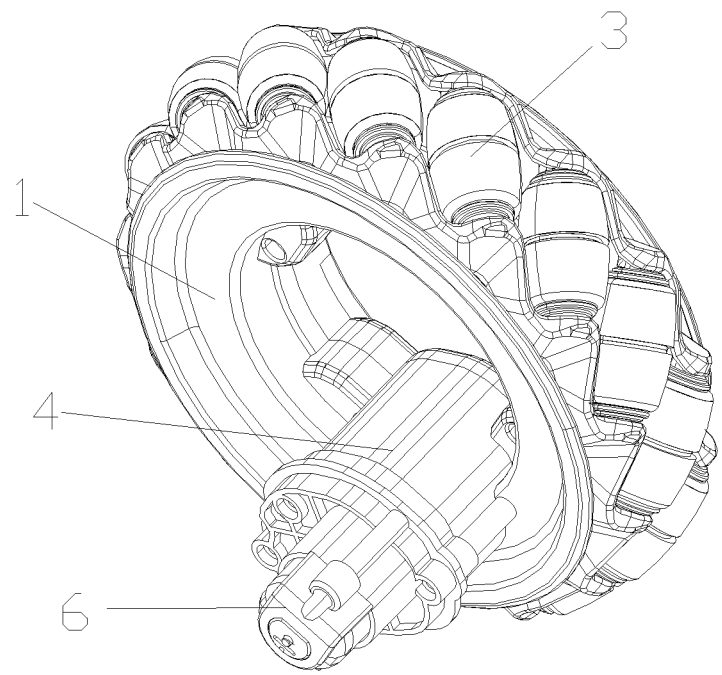
FIG. 1 is an overall structural view of the eccentric omnidirectional wheel of the present invention.

The present invention is now further described in detail below with reference to the drawings. The drawings are simplified schematic illustrations intended only to show the essential features of the present invention by way of illustrations. Therefore, only structural formation related to the present invention will be shown in the drawings.

EMBODIMENT

Figure 2:
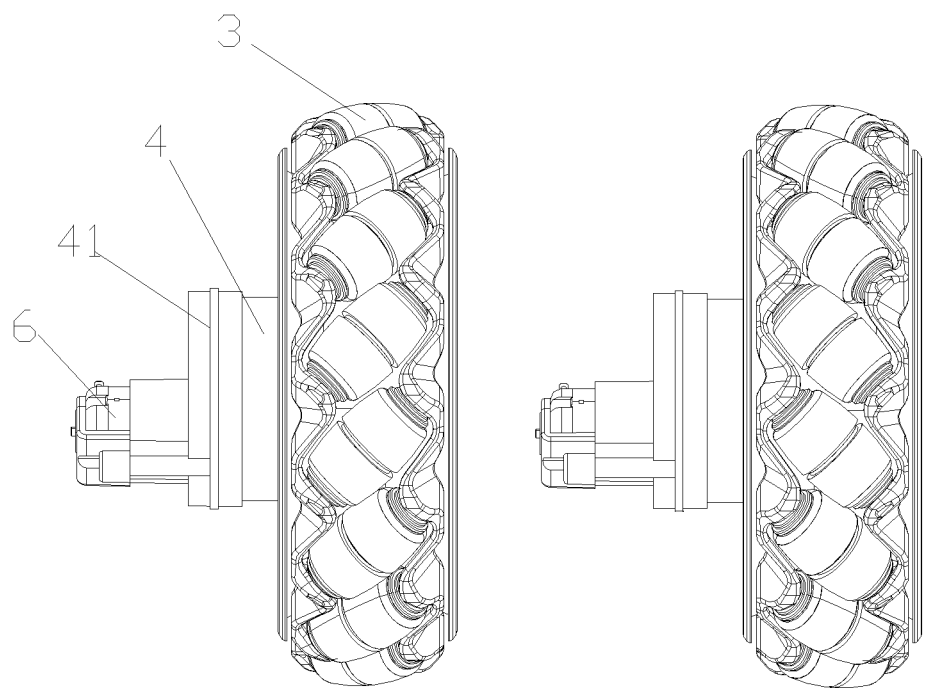
FIG. 2 is a front view of the eccentric omnidirectional wheel of the present invention.
Figure 3:
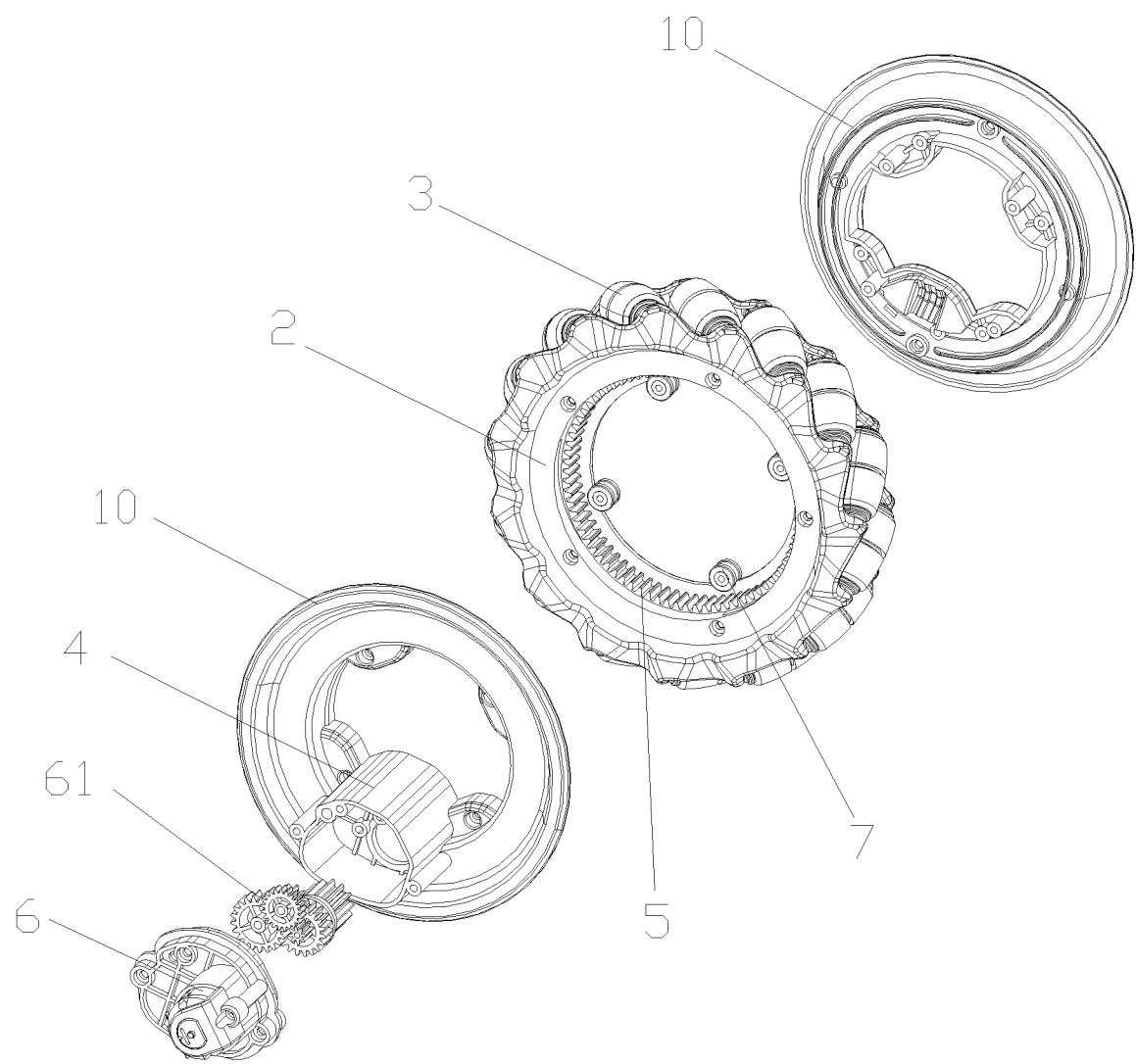
FIG. 3 is an exploded structural view of the eccentric omnidirectional wheel of the present invention.

FIGS. 1-3 show an eccentric omnidirectional wheel, comprising a fixed wheel frame 1 having a hollow center, a driving ring 2, a driving mechanism and at least one slanted rollable barrel 3 evenly distributed around an outer perimeter of the driving ring 2; the driving ring 2 sleeves onto an outer perimeter of the fixed wheel frame 1 and is rotatably connected with the fixed wheel frame 1; an eccentric shaft seat 4 is mounted at an inner perimeter of the fixed wheel frame 1; the driving mechanism is connected with the driving ring 2 to achieve motion transmission.

Wherein, the eccentric shaft seat 4 is mounted at an inner perimeter of the fixed wheel frame 1 having the hollow center as described; the eccentric shaft seat 4 is connected to an external wheel shaft, such that the eccentric omnidirectional wheel can be configured eccentrically which lowers the height of a toy car and therefore increases its stability; the eccentric shaft seat 4 can be mounted at any position of the inner perimeter of the fixed wheel frame 1, such that the height and position of the eccentric shaft seat 4 in the fixed wheel frame 1 can be adjusted according to specific requirements, thereby adjusting the height of the overall toy car which the eccentric omnidirectional wheel is correspondingly installed into.

The driving mechanism comprises an internal gear 5 provided around an inner perimeter of the driving ring 2, and a motor 6 that drives the internal gear 5.

The eccentric shaft seat 4 also has a hollow center in which the motor 6 is mounted; the motor 6 is fixed within the hollow center by an end cap at one side of the eccentric shaft seat 4; a tail portion of the motor 6 is exposed and protrudes out of another side of the eccentric shaft seat 4; the motor 6 is connected with the internal gear 5 to achieve motion transmission through a set of reduction gears 61; said another side of the eccentric shaft seat 4 is provided with screw holes, and an outer perimeter of the eccentric shaft seat 4 is provided with a rib 41, to facilitate extended connection with an external mounting seat, or connection with a wheel shaft rack of the toy car.

The eccentric omnidirectional wheel of the present invention has an independent motor 6 to drive its rotation. When four eccentric omnidirectional wheels of the present invention are mounted to the toy car, the toy car can achieve drifting movement easily, and can also easily achieve movements like turning, U-turning and rotation.

A position limiting flange 51 is provided around a perimeter of an inner end surface of the internal gear 5. At least one direction guiding wheel 7 is provided around an inner perimeter of the position limiting flange 51. In the present embodiment, there are four direction guiding wheels 7.

Figure 4:
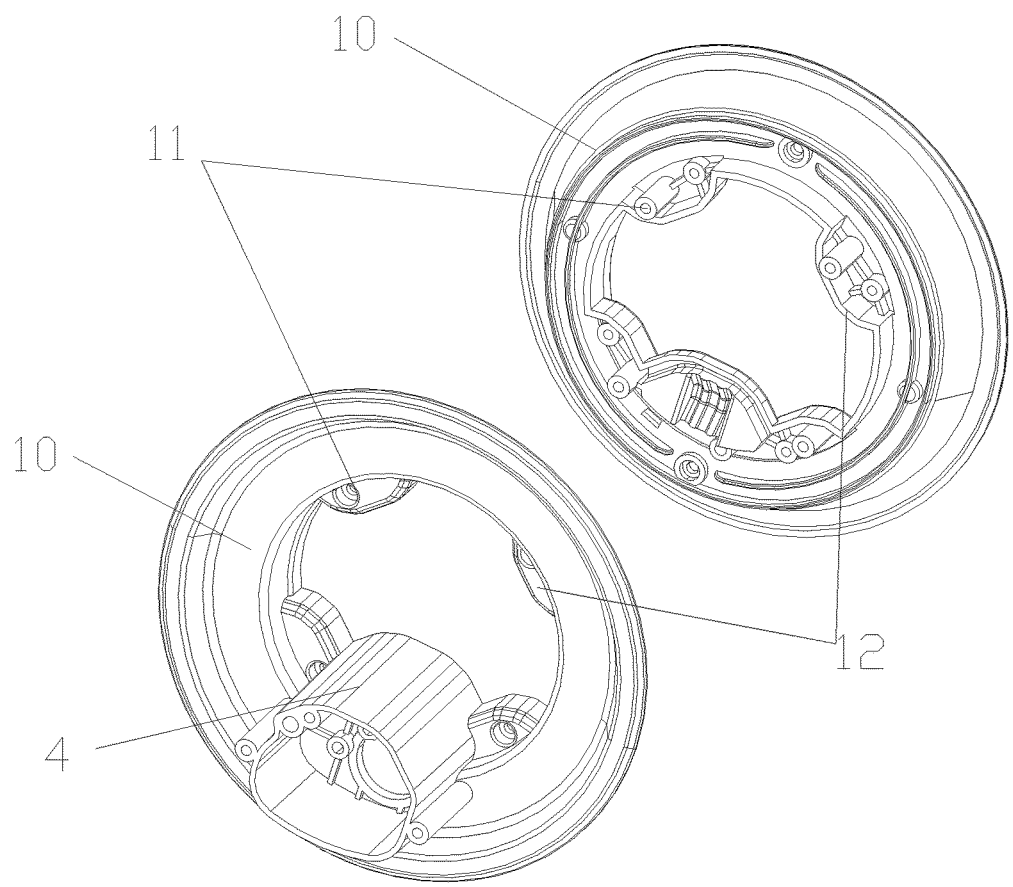
FIG. 4 is a structural view of a fixed wheel frame according to the eccentric omnidirectional wheel of the present invention.

As shown in FIG. 4, the fixed wheel frame 1 comprises two parts, which are inner and outer fixed wheel frame shells 10; internal sides of both the inner and outer fixed wheel frame shells are each provided with at least one inwardly protruding accommodating chamber 12 and a screw sheath 11 provided in each inwardly protruding accommodating chamber; the at least one direction guiding wheel 7 is provided within an enclosure of said at least one inwardly protruding accommodating chamber 12 of one of the internal sides of the inner and outer fixed wheel frame shells and corresponding said at least one inwardly protruding accommodating chamber 12 of another one of the internal sides of the inner and outer fixed wheel frame shells. Said at least one direction guiding wheel 7 is mounted to the enclosure via a rotational shaft. When the inner and outer fixed wheel frame shells 10 are coupled, they are fixed by screws. One side of said at least one direction guiding wheel 7 is positioned within an enclosing space of the internal gear 5 and proximal to the internal gear 5. There are four inwardly protruding accommodating chambers 12 on each of the inner and outer fixed wheel frame shells 10.

Figure 8:
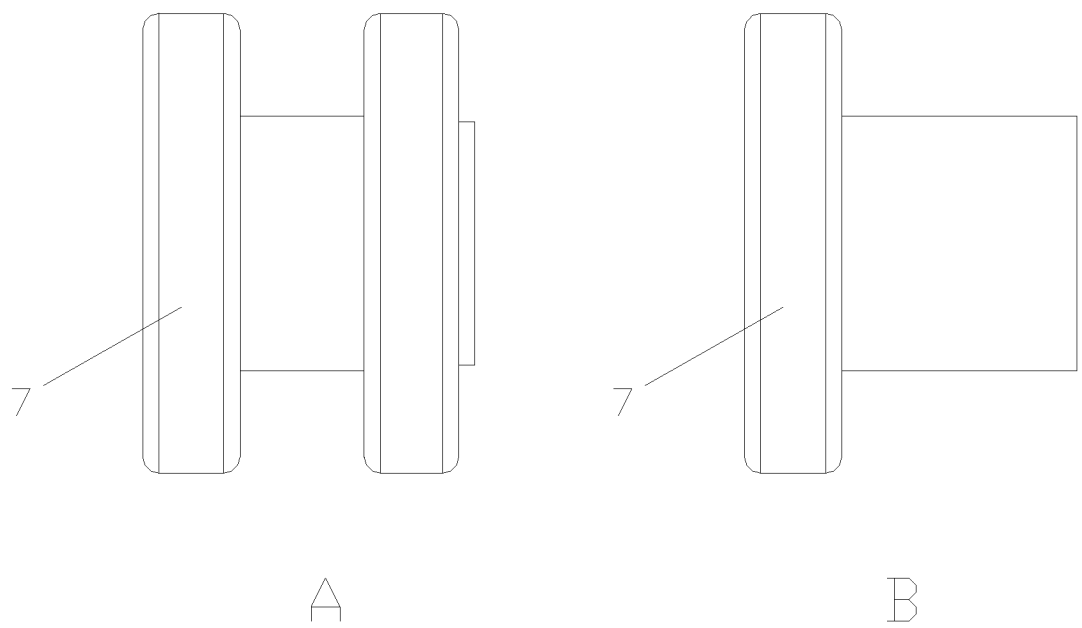
FIG. 8 is a structural view of two embodiments of a direction guiding wheel according to the eccentric omnidirectional wheel of the present invention.

Wherein, said at least one direction guiding wheel 7 has an axial sectional surface in an "I" shape (or "T" shape, as shown in drawing B of FIG. 8). A circular groove is formed in a middle section of said at least one direction guiding wheel 7 around a circumference thereof. The groove accommodates the position limiting flange 51 provided around the perimeter of the inner end surface of the internal gear 5, so that said at least one direction guiding wheel 7 can be stably positioned.

Figure 5:
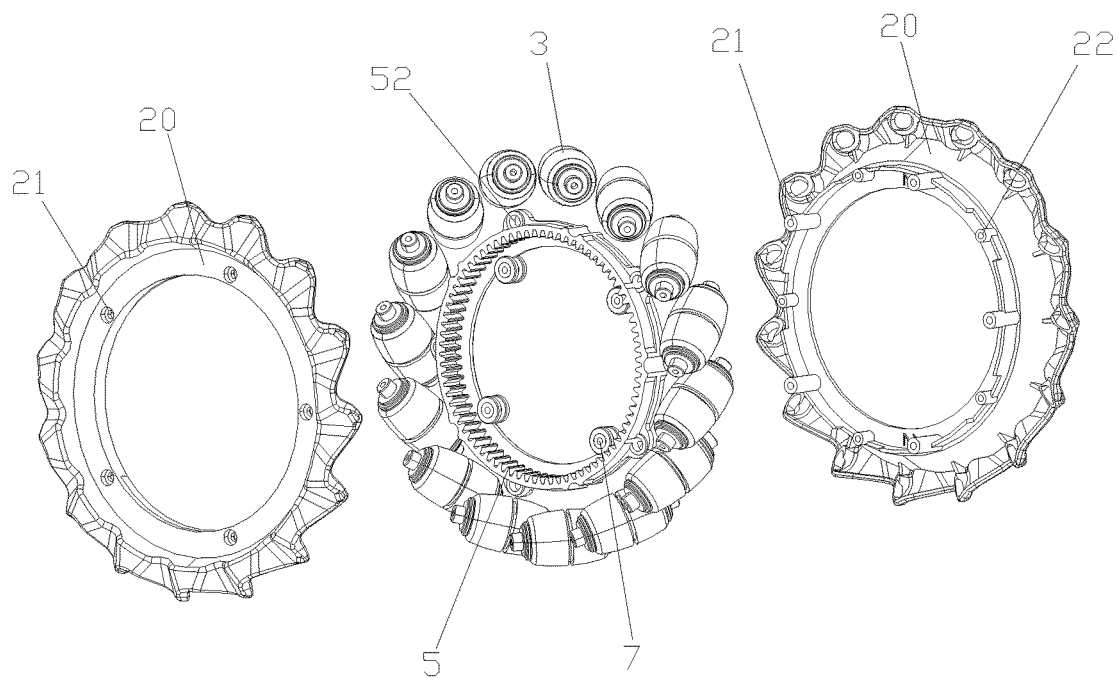
FIG. 5 is a structural view of a driving ring according to the eccentric omnidirectional wheel of the present invention.

As shown in FIG. 5, the driving ring 2 comprises two parts, which are inner and outer driving ring shells 20; at least one screw accommodating component 21 is provided in between the inner and outer driving ring shells 20, wherein one of the inner and outer driving ring shells 20 is provided with a screw hole opening of said at least one screw accommodating component, and another one of the inner and outer driving ring shells 20 is provided with a corresponding screw seat of said at least one screw accommodating component.

Figure 6:
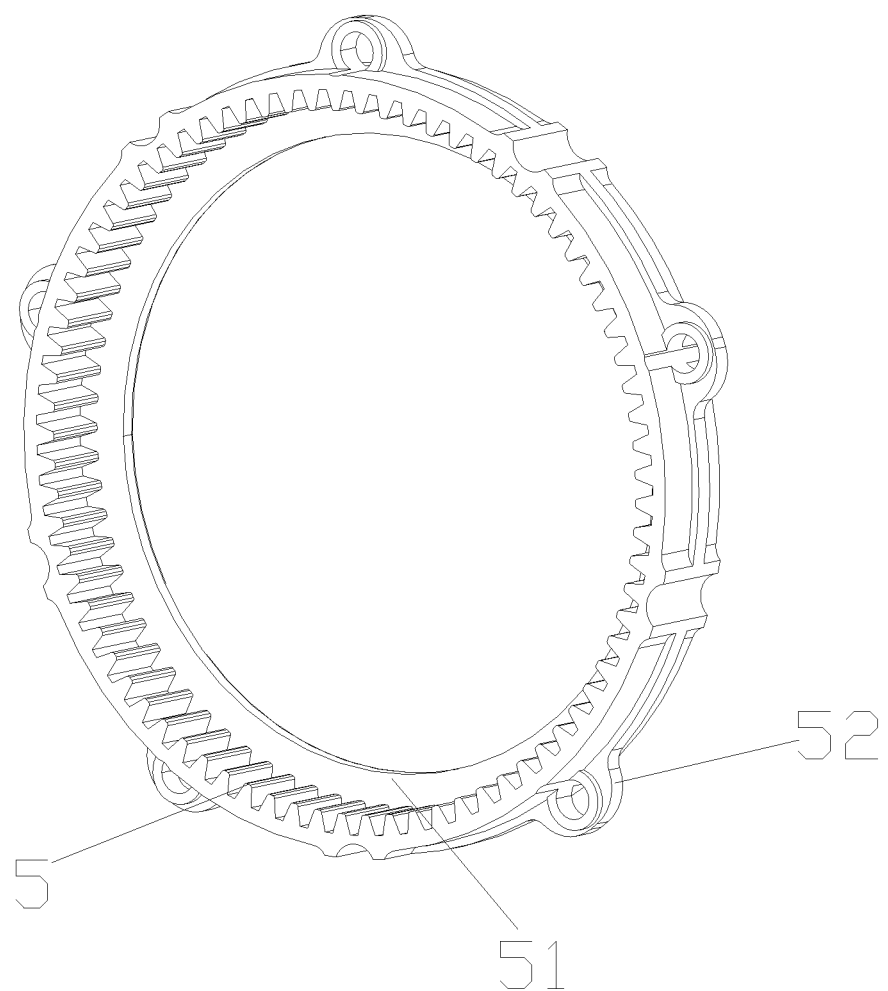
FIG. 6 is a structural view of an internal gear of the driving ring according to the eccentric omnidirectional wheel of the present invention.
Figure 7:
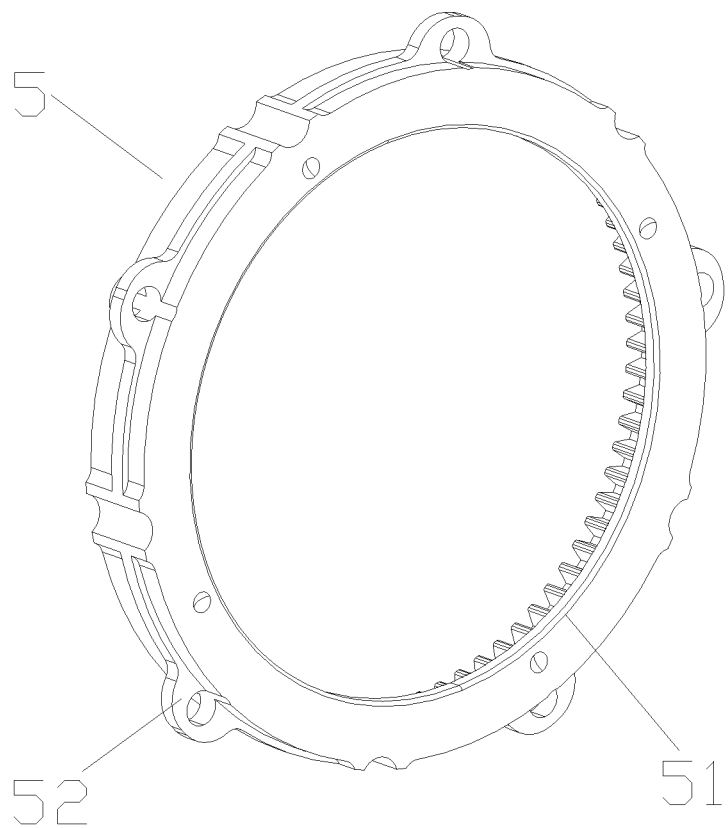
FIG. 7 is a rear perspective view of the internal gear of the driving ring according to the eccentric omnidirectional wheel of the present invention.

As shown in FIGS. 5-7, the driving ring 2 is internally provided with position fixing columns 22 mounted correspondingly on inner sides of both the inner and outer driving ring shells; the position fixing columns 22 on the inner sides of both the inner and outer driving ring shells abut and connect correspondingly to one another. An outer perimeter of the internal gear 5 is provided with position fixing ears 52; the position fixing ears 52 are positioned corresponding to the position fixing columns 22. The position fixing columns 22 are inserted into the position fixing ears 52 correspondingly. When said at least one screw accommodating component 21 provided in between the inner and outer driving ring shells 20 is inserted with a screw, the inner and outer driving ring shells 20 and the internal gear 5 between the inner and outer driving ring shells 20 are fixed together, and the position fixing columns 22 are inserted into through holes of the corresponding position fixing ears 52.

Figure 9:
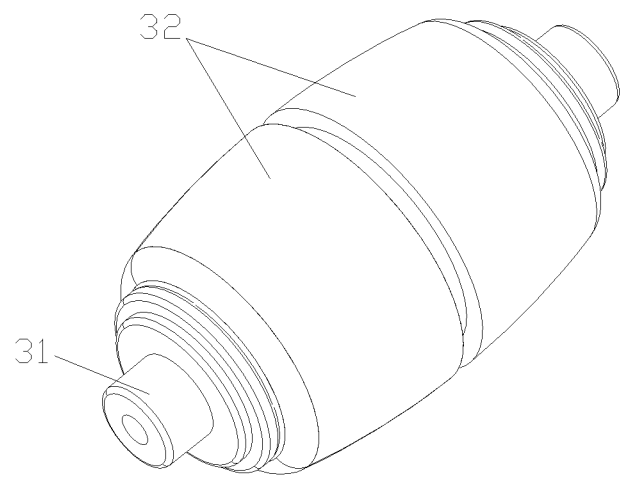
FIG. 9 is a structural view of a slanted rollable barrel according to the eccentric omnidirectional wheel of the present invention.
Figure 10:
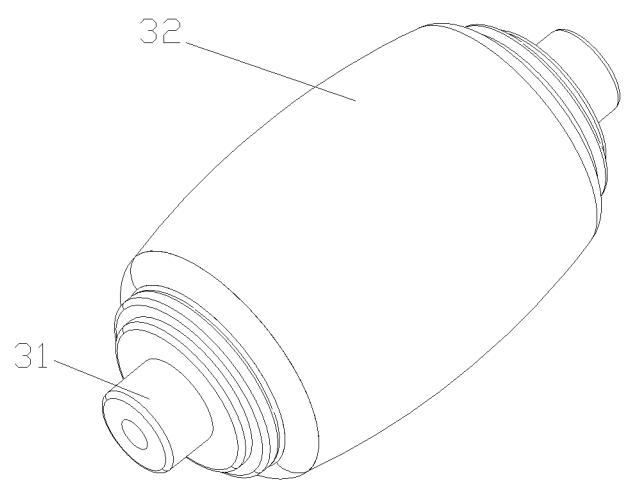
FIG. 10 is another embodiment of the slanted rollable barrel according to the eccentric omnidirectional wheel of the present invention.

Said at least one slanted rollable barrel 3 comprises a rotational shaft 31 and at least one barrel 32, provided around a peripheral side of the driving ring 2, and configured in a slanted angle with respect to a central axis of the eccentric omnidirectional wheel; the at least one barrel 32 sleeves around an outer side of the rotational shaft 31; wherein there are two barrels 32 around the rotational shaft 31 (as shown in FIG. 9); the at least one barrel 32 has a shape of a conical frustum, such that there is an increasing diameter towards the middle of the slanted rollable barrel, and a decreasing diameter towards two sides of the slanted rollable barrel; wherein, the slanted angle of the slanted rollable barrel with respect to the central axis of the eccentric omnidirectional wheel is 45 degrees. The two barrels 32 may also be combined as one barrel (as shown in FIG. 10).

Figure 11:
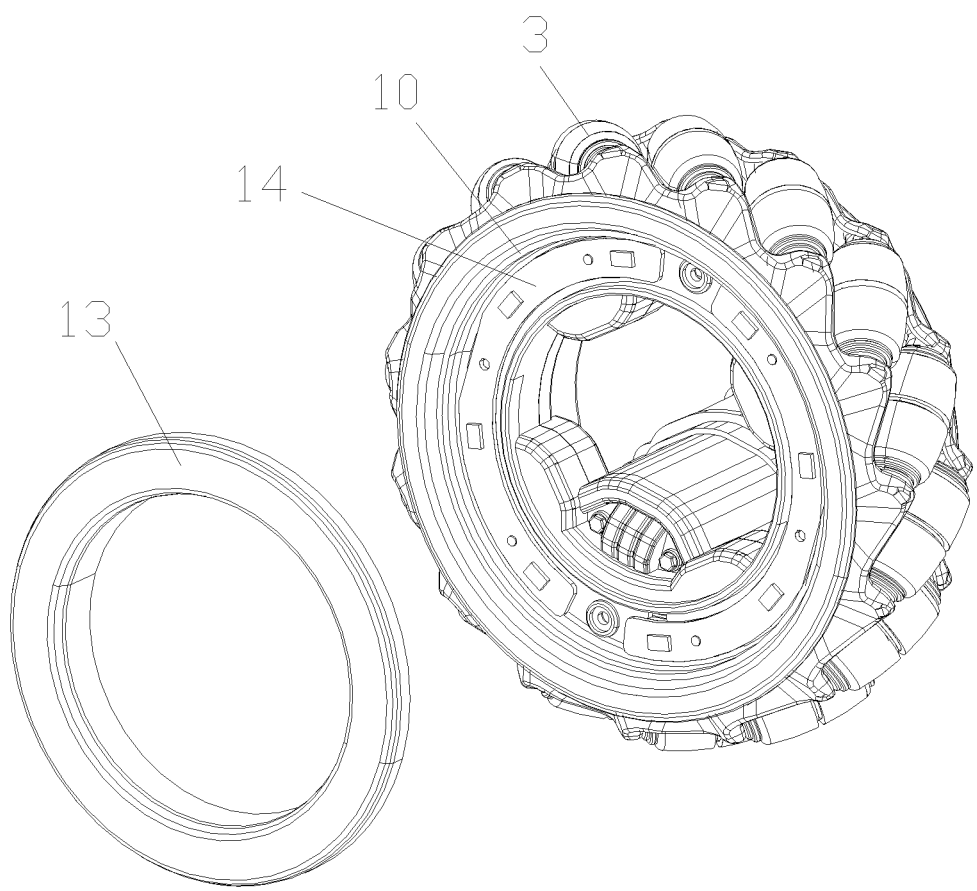
FIG. 11 is a structural view of a light emitting device of the eccentric omnidirectional wheel of the present invention.

As shown in FIG. 11, an outer end surface of the fixed wheel frame 1 is provided with light emitting device. The light emitting device comprises a transparent plastic piece 13 and an LED light emitting panel 14 disposed on the outer end surface of the fixed wheel frame 1; the LED light emitting panel is positioned between the fixed wheel frame 1 and the transparent plastic piece 13. A traditional car wheel requires the entire wheel to rotate in order to drive the car to move, therefore it is not possible to install fixedly positioned lights at the outer side of the wheel. In the present embodiment, outer side of the fixed wheel frame 1 is installed with fixedly positioned lights without affecting movement of the toy car. Therefore the toy car of the present invention has colorful light effects and is more entertaining.

The present invention provides an eccentric omnidirectional wheel, wherein the eccentric shaft seat 4 is mounted at an inner perimeter of the fixed wheel frame 1 having the hollow center; the eccentric shaft seat 4 is connected to an external wheel shaft, such that the eccentric omnidirectional wheel can be configured eccentrically which lowers the height of a toy car and therefore increases its stability; the eccentric shaft seat 4 can be mounted at any position of the inner perimeter of the fixed wheel frame 1, such that the height and position of the eccentric shaft seat 4 in the fixed wheel frame 1 can be adjusted according to specific requirements, thereby adjusting the height of the overall toy car which the eccentric omnidirectional wheel is correspondingly installed into. The outer side of the fixed wheel frame 1 is installed with fixedly positioned lights without affecting movement of the toy car. Therefore the toy car of the present invention has colorful light effects and is more entertaining.

Based on the preferred embodiment of the present invention as described above, and in accordance with the description above, without deviating from the scope of the concept of the present invention, it is absolutely possible to make various changes and modifications of the present invention by a person skilled in the art. The technical scope of the present invention should not be limited to the above description. The technical scope of the present invention is defined by the scope of the claims.

What is claimed is:

1. An eccentric omnidirectional wheel, comprising a fixed wheel frame having a hollow center, a driving ring, a driving mechanism and at least one slanted rollable barrel evenly distributed around an outer perimeter of the driving ring; the driving ring sleeves onto an outer perimeter of the fixed wheel frame and is rotatably connected with the fixed wheel frame; an eccentric shaft seat is mounted at an inner perimeter of the fixed wheel frame; the driving mechanism is connected with the driving ring to achieve motion transmissions; the driving mechanism comprises an internal gear provided around an inner perimeter of the driving ring, and a motor that drives the internal gear: the eccentric shaft seat also has a hollow center; an outer perimeter of the eccentric shaft seat is provided with a rib; the motor is mounted in the eccentric shaft seat; the motor is connected with the internal gear to achieve motion transmission through a set of reduction gears.

2. The eccentric omnidirectional wheel of claim 1, wherein a position limiting flange is provided around a perimeter of an inner end surface of the internal gear; at least one direction guiding wheel is provided around an inner perimeter of the position limiting flange.

3. The eccentric omnidirectional wheel of claim 2, wherein the fixed wheel frame comprises two parts, which are inner and outer fixed wheel frame shells; internal sides of both the inner and outer fixed wheel frame shells are each provided with at least one inwardly protruding accommodating chamber and a screw sheath provided in each inwardly protruding accommodating chamber; the at least one direction guiding wheel is provided within an enclosure of said at least one inwardly protruding accommodating chamber of one of the internal sides of the inner and outer fixed wheel frame shells and corresponding said at least one inwardly protruding accommodating chamber of another one of the internal sides of the inner and outer fixed wheel frame shells.

4. The eccentric omnidirectional wheel of claim 3, wherein the driving ring comprises two parts, which are inner and outer driving ring shells; at least one screw accommodating component is provided in between the inner and outer driving ring shells.

5. The eccentric omnidirectional wheel of claim 4, wherein the driving ring is internally provided with position fixing columns mounted correspondingly on inner sides of both the inner and outer driving ring shells; the position fixing columns on the inner sides of both the inner and outer driving ring shells abut and connect correspondingly to one another; an outer perimeter of the internal gear is provided with position fixing ears; the position fixing ears are positioned corresponding to the position fixing columns; the position fixing columns are inserted into the position fixing ears correspondingly.

6. The eccentric omnidirectional wheel of claim 1, wherein said at least one slanted rollable barrel comprises a rotational shaft and at least one barrel, provided around a peripheral side of the driving ring, and configured in a slanted angle with respect to a central axis of the eccentric omnidirectional wheel; the at least one barrel sleeves around an outer side of the rotational shaft.

7. The eccentric omnidirectional wheel of claim 1, wherein an outer end surface of the fixed wheel frame is provided with a light emitting device.

* * * * *